United States Patent
Langrel et al.

(10) Patent No.: US 8,072,657 B2
(45) Date of Patent: Dec. 6, 2011

(54) DUAL PATH SCANNING SYSTEM AND METHOD

(75) Inventors: Charles Brandon Langrel, Lexington, KY (US); Allen Wayne Waugerman, Lexington, KY (US); Stephen Ray Wilson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 263 days.

(21) Appl. No.: 12/336,115

(22) Filed: Dec. 16, 2008

(65) Prior Publication Data

US 2010/0149607 A1    Jun. 17, 2010

(51) Int. Cl.
*H04N 1/04*    (2006.01)
*G03G 15/00*    (2006.01)

(52) U.S. Cl. ........ 358/498; 358/496; 358/408; 358/483; 399/364; 399/374; 399/367

(58) Field of Classification Search ................. 358/498, 358/496, 483, 482, 408; 399/364, 374, 367, 399/369, 370, 377; 355/23, 24
See application file for complete search history.

(56) References Cited

U.S. PATENT DOCUMENTS

| 5,438,435 A * | 8/1995 | Lawniczak ................... 358/496 |
| 2008/0038029 A1 * | 2/2008 | Wang et al. ................... 399/374 |

* cited by examiner

*Primary Examiner* — Cheukfan Lee
(74) *Attorney, Agent, or Firm* — John Victor Pezdek; Justin M. Tromp

(57) ABSTRACT

It is a first aspect of the present invention to provide a scanning device that includes a first imaging device adapted to convert contents of a first surface of a medium to a digital representation of the contents of the first surface of the medium, a scanning path adapted to guide the medium adjacent to the first imaging device, a first output path for guiding the medium to a first output tray, the first output path connected to the scanning path, a second output path for guiding the medium to a second output tray, the second output path connected to the scanning path, and a diverter guide adapted to direct the medium from the scanning path to one of the first output path and the second output path.

13 Claims, 2 Drawing Sheets

DUAL PATH SCANNING SYSTEM AND METHOD

FIELD OF THE INVENTION

The present invention relates to a system and method of scanning media. Specifically, the present invention involves integrating at least two media paths into one scanning device such that different media can be scanned using different media paths.

BACKGROUND OF THE INVENTION

Typical Automatic Document Feeder (ADF) designs for scanning devices consist of "C" shaped paper path. A "C" shaped paper path allows a user to input a document face up into an input tray near the top of the scanning device and exit face down in an output tray below the input tray. The ADF would be attached to a scanning device that would scan the front side of the image as it passes to the exit area. One main advantage of this style of paper path is a compact design. Customers typically have limited space for a scanner device and thus require a small, but efficient design. One major limitation for this design is paper feed reliability.

The paper path can be designed to handle normal paper types effectively, but it is difficult to feed a wider range of media reliably. Typically, users desire to feed many different media types, sizes, weights, and thicknesses through a scanner ADF. This requirement would only be used periodically, as the majority of scan jobs involves normal paper types. One way to address this problem is to provide an ADF with a straight, short media path. The ADF would contain more than one imaging unit or scan head. This would allow the user to scan both sides of the media at the same time. The straight media path is very short and there are no major bends that the media encounters. The media is typically input on one side on top of the scan device and then exits to the opposite side. One drawback to this design is an increased overall footprint, specifically in terms of scanner width (or depth). This occurs because the output tray must extend far enough to support the recently scanned media.

Therefore, it would be preferable to provide a user the ability to scan a variety of media types without damaging the scanned objects while maintaining a small, compact form factor. Accordingly, the present invention is designed to overcome the shortcomings in current market products.

SUMMARY OF THE INVENTION

The present invention solves the above problems by providing a dual path scanning device with single pass duplex capabilities and adapted to scan a wide range of media types. Further, the present invention provides a method of scanning incorporating dual paper paths.

It is a first aspect of the present invention to provide a scanning device that includes a first imaging device adapted to convert contents of a first surface of a medium to a digital representation of the contents of the first surface of the medium, a scanning path adapted to guide the medium adjacent to the first imaging device, a first output path for guiding the medium to a first output tray, the first output path connected to the scanning path, a second output path for guiding the medium to a second output tray, the second output path connected to the scanning path, and a diverter guide adapted to direct the medium from the scanning path to one of the first output path and the second output path. In one embodiment of the first aspect, the scanning device further includes a second imaging device adapted to convert contents of a second surface of the medium to a digital representation of the contents of the second surface of the medium. In another embodiment of the first aspect, the scanning device further includes an actuation device adapted to engage the diverter guide to direct the medium from the scanning path to one of the first output path and the second output path.

In one embodiment of the first aspect the diverter guide is mechanically actuated by the actuation device. In another embodiment of the first aspect, the actuation device includes an output tray adapted to engage the diverter guide to direct the medium from the scanning path to one of the first output path and the second output path, the output tray being connected to the diverter guide. On yet another embodiment of the first aspect, the diverter guide is mechanically actuated by at least one of a solenoid, a servomotor, an actuator, and a transducer. In another embodiment of the first aspect, the actuation device is one of a tray, a lever, a button, a switch, a user interface, and a touch screen.

In one embodiment of the first aspect, the scanning device further includes a top pick mechanism adapted to propel a first medium of a media queue to the scanning path, the media queue including a plurality of media organized such that the first medium is physically on the top of the media queue and a last medium is physically on the bottom of the medium queue. In another embodiment of the first aspect, the scanning device further includes a bottom pick mechanism adapted to propel a last medium of a media queue to the scanning path, the media queue including a plurality of media organized such that a first medium is physically on the top of the media queue and the last medium is physically on the bottom of the medium queue. In yet another embodiment, the scanning device further includes a top pick mechanism adapted to propel a first medium of a media queue to the scanning path, and a bottom pick mechanism adapted to propel a last medium of the media queue to the scanning path, wherein the media queue includes a plurality of media organized such that the first medium is physically on the top of the media queue and the last medium is physically on the bottom of the medium queue.

In another embodiment of the first aspect, the scanning device further includes one or more sensing devices adapted to determine whether the medium should be diverted to the first output path or the second output path, the determination based on, at least in part, one or more of medium width, medium length, medium thickness, medium density, medium weight and medium orientation. In another embodiment, the one or more sensing devices output one or more signals capable of actuating the diverter guide to divert the medium to one of the first output path and the second output path.

In another embodiment of the first aspect, the first output path is a "C" path design such that the medium is flipped after leaving the scanning path. In another embodiment of the first aspect, the second output path is a substantially straight path design such that the medium is not flipped after leaving the scanning path.

It is a second aspect of the present invention to provide an automatic document feeder for a scanner that includes one or more scan heads for converting the contents of a document to digital signals corresponding to the contents of the document, a propel mechanism adapted to propel the document to a document path, the document path adapted to guide the document adjacent to the one or more scan heads; a first output path adapted to guide the document from the document path to a first output tray; a second output path adapted to guide the document from the document path to a second output tray; and a document diverter adapted to direct the document from the document path to one of the first output tray and the second output tray. In this aspect, the second output tray is coupled to the document diverter such that when the second output tray is in a first position, the document diverter directs the document to the first output tray and when the second output tray is in a second position, the document diverter directs the document to the second output tray.

In one embodiment of the second aspect, the document diverter guide is mechanically actuated to direct the document from the document path to one of the first output tray and the second output tray. In another embodiment of the second embodiment, the document diverter guide is mechanically actuated by at least one of a solenoid, a servomotor, an actuator, and a transducer.

It is a third aspect of the present invention to provide a method of scanning including the steps of: (a) providing a scanning device capable of scanning one or more surfaces of a media object; (b) inputting by a user the media object to be scanned; (c) initiating by a user a scan job by actuating an actuation mechanism corresponding to one of a standard media path and an alternate media path; (d) propelling the media object into the scanning device; (e) scanning one or more surfaces of the media object, the scanning step including converting the one or more surfaces of the media object to digital representations of the one or more surfaces of the media object; (f) upon actuation of the actuation mechanism corresponding to the standard media path, mechanically causing a diverter guide to align with the standard media path; (g) upon actuation of the actuation mechanism corresponding to the alternate media path, mechanically causing the diverter guide to align with the alternate media path; (h) based on the alignment of the diverter guide, propelling the media object through one of the standard media path and the alternate media path; and (i) based on the alignment of the diverter guide, expelling the media object to one of a standard media output tray or an alternate media output tray;

In one embodiment of the third aspect, the method of scanning further includes the step of (j) outputting the digital representations of the one or more surfaces of the media object by at least one of printing, faxing and emailing. In another embodiment of the third aspect, the step of initiating a scan job is replaced by the steps of: sensing by the scanning device whether the media object should follow a standard media path or an alternate media path; and actuating by the scanning device an actuation mechanism corresponding to one of the standard media path and the alternate media path.

In one embodiment of the third aspect, the step of propelling the media object through one of the standard media path and the alternate media path includes propelling the media object through a "C" path designed to flip the media object. In another embodiment of the third aspect, the step of propelling the media object through one of the standard media path and the alternate media path includes propelling the media object through a substantially straight path designed to not flip the media object.

From the foregoing disclosure and the following detailed description of various preferred embodiments it will be apparent to those skilled in the art that the present invention provides a significant advance in the art of scanning devices and methods. Additional features and advantages of various preferred embodiments will be better understood in view of the detailed description provided below.

BRIEF DESCRIPTION OF THE DRAWINGS

The present invention will be understood and appreciated more fully from the detailed description in conjunction with the following drawings in which.

DETAILED DESCRIPTION OF THE DRAWINGS

It will be apparent to those skilled in the art that many uses and variations are possible for the scanning device and method disclosed herein. The following detailed discussion of various alternative and preferred embodiments will illustrate the general principles of the invention. Other embodiments will be apparent to those skilled in the art given the benefit of this disclosure.

The disclosed scanning system, device and method may be incorporated within or into any scanning device or system. Exemplary systems may include, without limitation, standalone scanners, digital document senders, multifunction printing devices, or other scanning devices. "Imaging device," "imaging unit" and "scan head" refer to any imaging hardware capable of reproducing the contents of or a representation of a page or other media object. Also, "scanner," "scanning device" and "scanning system" are used interchangeably. "Document," "page" and "paper" may also be used interchangeably. "Medium," "media" and "media object" refer to any material or substrate having information thereon or being capable of having information thereon such as without limitation, text, words, graphics, photographs, visual depictions, and other information. "Medium," "media" and "media object" may be used interchangeably. "Couple" refers to any connection mechanism or method including without limitation, an electrical connection, a mechanical connection, or any other known connection mechanism or method.

Figure 1:
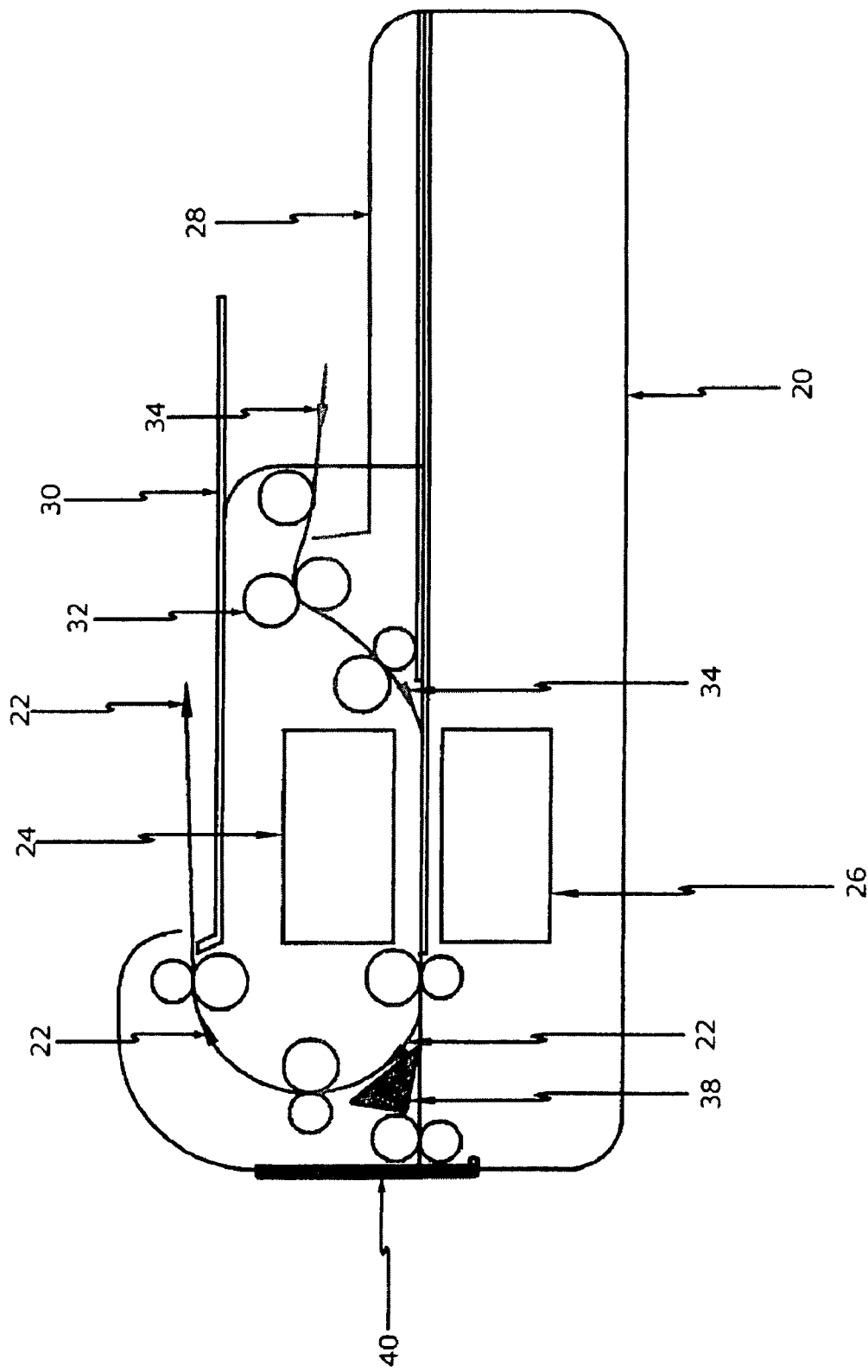
FIG. 1 depicts a cross-section view of an exemplary embodiment of the present invention.
Figure 2:
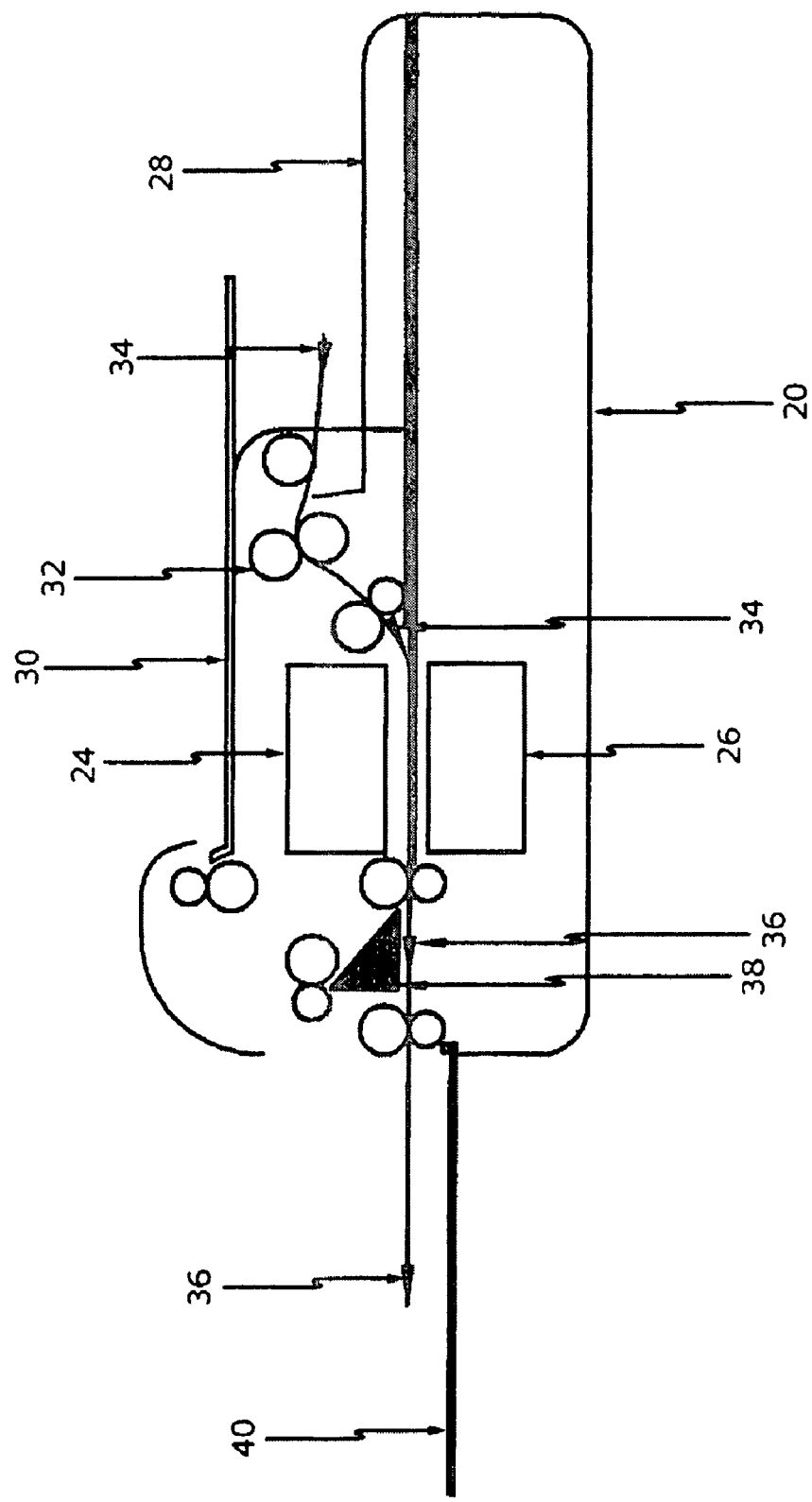
FIG. 2 depicts a cross-section view of an exemplary embodiment of the present invention.

FIGS. 1 and 2 depict cross-section views of exemplary embodiments of the present invention. Specifically, FIG. 1 depicts a scanning device 20 with an exemplary path for scanning a typical media object in one embodiment of the present invention. FIG. 2 depicts a scanning device 20 with an exemplary path for scanning a variety of media objects in one embodiment of the present invention. In these figures, bold arrows represent the path that a page or other media object may follow in various embodiments.

Some embodiments of the present invention provide a dual path automatic document feeder design with single pass duplex capabilities to be used with a scanning device 20. The dual media path would allow users to feed a wide variety of media types without sacrificing the compact design. In one embodiment, the default or main media path 22 of the ADF would consist of a "C" path design 22. The document feeder contains an imaging unit 24 that would capture the front side image data from the media object. In another embodiment, the document feeder contains two imaging units 24, 26 to capture the front and back sides of the media object. The document feeder could be attached to a scan device 20 to allow the user to scan both sides of the media object while it is being fed in a single pass. In this manner, scanning efficiency and throughput are improved.

In one embodiment, the document feeder would include an input tray 28 that could support multiple media objects. The orientation of the media objects in the input tray 28 could be loaded face up. The document feeder would have a top pick system that would feed a single media object from the top of the stack first. As shown in FIG. 1, the default media path 22 would form the shape of a "C" and the media object would exit to a first output tray 30 at the top of the device face down, preserving the collation of the media objects.

Throughout the scanning device 20, a plurality of propelling mechanisms 32 propel the media object through the scanning path 34 and then to either the "C" path 22 or the alternate output path 36. Propel mechanisms 32 may be rollers 32 driven by servomotors, solenoids or other driving mechanisms. In one embodiment, rollers 32 continuously or intermittently move or propel a media object through the scanning path 34 and then to either the "C" path 22 or the alternate output path 36.

The imaging device 24, 26 may be any imaging unit such as a scan head that is capable of reproducing the contents of a page or media object or representations of the contents of a page or media object. In one embodiment, the scanning device includes two imaging devices 24, 26 such that the scanning path 34 is positioned to allow the first imaging device 24 to scan a first surface of a media object and to allow the second imaging device 26 to scan a second surface of the media object. This configuration provides single pass duplex scan capabilities. Other embodiments of the present invention may include only one imaging device 24 positioned to scan the first surface of a media object.

After the media object is scanned and approaches the end of the scanning path 34, it reaches the diverter guide 38. The diverter guide 38 directs the media object to either a first output path 22 or a second output path 36. The scanning path 34 and the first 22 and second output paths 36 are connected to form continuous paths for the media object to travel. Specifically, when the diverter guide 38 directs the media object toward the first output path 22, the media object is propelled continuously from the end of the scanning path 34 to the beginning of the first output path 22. Similarly, when the diverter guide 38 directs the media object toward the second output path 36, the media object is propelled continuously from the end of the scanning path 34 to the beginning of the second output path 36. In one embodiment, the diverter guide 38 directs the media object to either the "C" path 22 (as shown in FIG. 1) or an alternate, substantially straight output path 36 (as shown in FIG. 2). In one embodiment, the diverter guide 38 is mechanically actuated by an actuation device such as a solenoid, a servomotor, an actuator, and a transducer. In one embodiment, the actuation device may be triggered by one of a tray 40, a lever, a button, a switch, a user interface, and a touch screen. When the actuation device actuates the diverter guide 38, the diverter guide 38 moves or pivots to direct the media object from the scanning path 34 to either the first output path 22 or the second output path 36.

In one embodiment, the diverter guide 38 is controlled by the position of the side tray 40 of the scanner 20. When the side tray 40 is closed or flush against the side of the scanner 20, the diverter guide 38 guides the media object to the "C" path 22 and out to an upper output tray 30 (such as is shown in FIG. 1). When the side tray 40 is opened or not flush against the side of the scanner 20, the diverter guide 38 guides the media object to the alternate output path 36 and out to the opened side tray 40 (such as is shown in FIG. 2). As shown in FIG. 2, the opened side tray 40 is positioned substantially perpendicular to the side of the scanner 20 to act as the alternate output tray 40 to hold the scanned media objects.

One feature of some embodiments of the present invention is the compact form factor of the scanner 20. The scanner 20 width can be minimized because the media objects are guided in a "C" shape and output above the input tray 28. The shape of the "C" path 22 is ideal for preserving space, but limits the type of media objects that can be fed reliably through the scanner 20. The tight radius of the "C" path 22 works well with standard 20 lb. paper, but can introduce feed problems when other media objects are scanned. These feed problems may include bending, jamming and skewing of the media.

The short, substantially straight alternate output path 36 in some embodiments minimizes potential feed problems. The alternate output path 36 of the document feeder may be accessed if the user has problems feeding the media object through the "C" path 22 or if the user desires to feed an unusual type of media object through the scanner 20. In one embodiment, the user can utilize the alternate output path 36 by simply opening the side tray 40. The diverter guide 38 would release and allow the media object to feed straight past the imaging device(s) 24, 26 and exit the device 20 at the opposite side of the input tray 28 as shown in FIG. 2. In this embodiment, the document feeder could have a bottom pick system that would feed a single media object from the bottom of the stack first. The alternate output path 36 in this embodiment allows the media object to exit the side of the device 20 face up, preserving the collation of the media objects. In this manner, the media objects could still be loaded in the input tray 28 face up. In another embodiment, a top pick system could be used in combination with the alternate output path 36. This setup would still scan the media objects, but collation of the media objects would not be preserved.

The short, substantially straight alternate output path 36 could be shorter than the "C" path 22. Also, the alternate output path 36 eliminates potential bends that may result from the sharp curvature of the "C" path 22. Therefore, the combination of the "C" path 22 and the alternate output path 36 allows for a much wider range of media types and weights to be scanned reliably and quickly.

There can potentially be infinite configurations of output paths 22, 36 implemented in the present invention. FIGS. 1 and 2 depict embodiments which allow the ADF unit to be packaged at the right end of the scanner 20. This could provide both functional and construction advantages. The present invention can also be implemented to allow the first 22 or second output path 36 to be located at the left end, front end or back end of a scanning device 20.

In one embodiment of the present invention, one or more sensing devices or sensors may be implemented adjacent to the scanning path 34 or immediately prior to the media object entering the scanning path 34. In an exemplary embodiment, these sensors would be placed at the beginning of the scanning path 34 before the media object reaches the imaging device(s) 24, 26. In any event, the sensors would need to perform sensing prior to the media object reaching the diverter guide 38. The sensors determine whether the media object should be diverted to the first output path 22 or the second output path 36. This determination may be based on, at least in part, one or more of medium width, medium length, medium thickness, medium density, medium weight and medium orientation. These sensors could eliminate the need for user input or manual actuation of the diverter guide 38. These sensors could be optical sensors, mechanical sensors, electrical sensors or any other sensors capable of determining whether the media object is of a type appropriate for the first output path 22 or the second output path 36.

The apparatuses, uses, and methods disclosed herein have been described without reference to specific hardware. However, the apparatuses, uses, and methods disclosed herein have been described in a manner sufficient to enable persons of ordinary skill in the art to readily adapt commercially available hardware as may be needed to reduce any of the embodiments of the present invention to practice without undue experimentation.

Following from the above description and invention summaries, it should be apparent to persons of ordinary skill in the art that, while the methods and apparatuses herein described constitute exemplary embodiments of the present invention, it is to be understood that the inventions contained herein are not limited to the above precise embodiments and that changes may be made without departing from the scope of the invention as defined by the claims. Likewise, it is to be understood that the invention is defined by the claims and it is not necessary to meet any or all of the identified advantages or objects of the invention disclosed herein in order to fall within the scope of the claims, since inherent and/or unforeseen advantages of the present invention may exist even though they may not have been explicitly discussed herein.

What is claimed is:

1. A scanning device, comprising:
   an imaging device for converting contents of a surface of a medium to a digital representation of the contents of the surface of the medium;
   a scanning path for guiding the medium adjacent to the imaging device;
   a first output path connected to the scanning path for guiding the medium from the scanning path to a first output tray;
   a second output path connected to the scanning path for guiding the medium from the scanning path to a second output tray; and
   a movable diverter guide positioned to direct the medium from the scanning path to one of the first output path and the second output path;
   the second output tray coupled to the diverter guide and movable between a first position and a second position to cause the diverter guide to direct the medium from the scanning path to one of the first output path and the second output path.

2. The scanning device of claim 1, wherein the diverter guide is mechanically actuated by the second output tray.

3. The scanning device of claim 1, further comprising a top pick mechanism positioned to propel a first medium of a media queue to the scanning path, the media queue including a plurality of media organized such that the first medium is physically on the top of the media queue and a last medium is physically on the bottom of the medium queue.

4. The scanning device of claim 1, further comprising a bottom pick mechanism positioned to propel a last medium of a media queue to the scanning path, the media queue including a plurality of media organized such that a first medium is physically on the top of the media queue and the last medium is physically on the bottom of the medium queue.

5. The scanning device of claim 1, further comprising:
   a top pick mechanism positioned to propel a first medium of a media queue to the scanning path; and
   a bottom pick mechanism positioned to propel a last medium of the media queue to the scanning path;
   wherein the media queue includes a plurality of media organized such that the first medium is physically on the top of the media queue and the last medium is physically on the bottom of the medium queue.

6. The scanning device of claim 1, wherein the first output path is a "C" path design such that the medium is flipped after leaving the scanning path.

7. The scanning device of claim 1, wherein the second output path is a substantially straight path design such that the medium is not flipped after leaving the scanning path.

8. An automatic document feeder for a scanner, comprising:
   one or more scan heads for converting contents of a document to digital signals corresponding to the contents of the document;
   a propel mechanism positioned to propel the document to a document path that guides the document adjacent to the one or more scan heads;
   a first output path for guiding the document from the document path to a first output tray;
   a second output path for guiding the document from the document path to a second output tray; and
   a movable document diverter positioned to direct the document from the document path to one of the first output tray and the second output tray;
   wherein the second output tray is coupled to the document diverter such that when the second output tray is in a first position, the document diverter directs the document to the first output tray and when the second output tray is in a second position, the document diverter directs the document to the second output tray.

9. The automatic document feeder for a scanner of claim 8, wherein the document diverter guide is mechanically actuated to direct the document from the document path to one of the first output tray and the second output tray.

10. The automatic document feeder for a scanner of claim 9, wherein the document diverter guide is mechanically actuated by at least one of a solenoid, a servomotor, an actuator, and a transducer.

11. A method of scanning, comprising:
    advancing a media object along a media path of a scanning device;
    scanning one or more surfaces of the media object;
    moving an output tray between two positions causing a diverter guide to move between a first position aligned with a standard media path and a second position aligned with an alternate media path;
    based on the alignment of the diverter guide, advancing the media object through one of the standard media path and the alternate media path; and
    based on the alignment of the diverter guide, expelling the media object to one of a standard media output tray and an alternate media output tray.

12. The method of scanning of claim 11, wherein the step of advancing the media object through one of the standard media path and the alternate media path includes advancing the media object through a "C" path designed to flip the media object.

13. The method of scanning of claim 11, wherein the step of advancing the media object through one of the standard media path and the alternate media path includes advancing the media object through a substantially straight path designed to not flip the media object.

* * * * *